Nov. 24, 1936.　　　　R. M. McKINNEY ET AL　　　　2,062,137
COLORED TITANIUM DIOXIDE PIGMENTS
Filed Jan. 11, 1935　　　2 Sheets-Sheet 1

Fig. 1.

INVENTORS.
CARLTON E. SMITH &
ROBERT M. McKINNEY.
BY
ATTORNEY.

Nov. 24, 1936.                R. M. McKINNEY ET AL                2,062,137
                        COLORED TITANIUM DIOXIDE PIGMENTS
                         Filed Jan. 11, 1935         2 Sheets-Sheet 2

Fig. 2.

INVENTORS.
CARLTON E. SMITH &
ROBERT M. McKINNEY.
BY
ATTORNEY.

Patented Nov. 24, 1936

2,062,137

UNITED STATES PATENT OFFICE 2,062,137

COLORED TITANIUM DIOXIDE PIGMENTS

Robert M. McKinney and Carlton E. Smith, Linthicum Heights, Md., assignors, by mesne assignments, to E. I. du Pont de Nemours and Company, a corporation of Delaware

REISSUED
APR 1 6 1940

Application January 11, 1935, Serial No. 1,284

15 Claims. (Cl. 134—58)

The present invention relates to titanium oxide pigments of distinctive colors or tints, processes of making the same and coating compositions such as paints or enamels made therefrom.

Tinted titanium oxide pigments are produced according to our invention by combining an uncalcined titanium oxygen compound with a compound of a heavy metal which, on calcination with a titanium oxygen compound, forms a colored compound, and then calcining the product.

The heavy metal compounds suitable in our invention are those which on heating to elevated temperatures form colored compounds, for instance colored oxides or titanates. The presence of a titanium oxide during calcination may modify the tint or color of the oxide.

Other common properties which distinguish the metals useful in our invention are that their oxides are colored and that they form black sulfides.

Commercially available for our purpose are mainly compounds of vanadium, chromium, iron, cobalt, nickel, manganese and copper which have atomic weights between about 50 and 64 inclusive.

Among the various metals of the above types which we can use, we found chromium and vanadium particularly useful for the main reason that their power of imparting color to the titanium pigment is exceedingly strong, only very small amounts of chromium and vanadium being required to produce a distinct color in the pigment.

The type of compound to be used with each metal is rather immaterial. We can use water insoluble compounds such as the oxide or hydroxide of the metal to be incorporated with the uncalcined titanium oxide, as well as water soluble compounds such as metal salts: chloride, sulfate, nitrate, oxalate, or such salts in which the metal is in the anion, such as chromates and vanadates, provided such soluble compounds decompose or are otherwise transformed on calcination into water insoluble compounds.

The products of our invention comprise particles of titanium dioxide containing a small amount of a heavy metal compound physically or chemically associated with the titanium oxide, said particles having a distinctive color or tint other than white. It will be understood that the expressions, color, tint, colored, tinted, etc. as used herein exclude white but include various shades of gray. By the expression colored compound of a heavy metal contained in a tinted titanium pigment of our invention as used herein we intend to designate only such compounds which represent the reaction products of a heavy metal compound when calcined in the presence of a titanium compound.

The tinted titanium oxide of our invention produces, when mixed with paint vehicles with or without extenders, valuable tinted paints or enamels which are particularly characterized by non-chalking and non-fading characteristics.

Impure titanium oxide pigments have been produced in the infancy of this art but they were of the nature of discolored white pigments rather than pigments of distinctive tints as contemplated in the present invention, the amount of impurities contained in the products was less than the amounts of colored oxides we intentionally associate with the $TiO_2$. Dark colored pigments containing minor amounts of titanium oxides have also been produced from sludges obtained in the manufacture of white titanium products; in both above instances, however, it was impossible to control and duplicate the shade or tint of such pigments and what was obtained was entirely outside the range of tinted pigments contemplated in the present invention.

While perfectly white titanium oxide pigments can now be produced which are entirely satisfactory for the paint industries, there is a very wide field for colored or tinted pigments of the paint properties of $TiO_2$ which could heretofore not be produced with satisfactory properties. By our invention we are enabled to produce titanium pigments of shades ranging from the extreme of red to the other extreme of green through such shades or tints as grays, buffs, yellows, light browns, tans, etc. and such pigments have the valuable properties of straight $TiO_2$ pigments, and are in chemical properties and constitution distinguished from titanates which are salts of titanic acid with bases. Ilmenite, the usual raw material for the obtention of titanium oxide is generally considered to be an iron titanate. Such known titanates are white as well as of distinctive colors depending upon the metal base combined with the titanic acid. Alkali, alkaline earth metal, magnesium, antimony titanates are, for instance, white, whereas titanates of most heavy metals are deeply colored, up to black.

Such titanates are also in pigmenting properties clearly distinguished from straight $TiO_2$ pigments, and from our novel pigments which are preponderately composed of straight $TiO_2$.

The small amounts of colored compounds contained in our novel pigments do not adversely affect the properties of the straight $TiO_2$ which form the basis of the pigments.

The tints in which titanium pigments have become available through our invention are best identified in reference to the Munsell color scale, described in an easily understandable form by F. G. Cooper in the Munsell Manual of Color, published 1929 by Munsell Color Co., Inc., in Baltimore, Md., and is based on the Atlas of the Munsell Color System and the Munsell Book of Color, an abridged edition of which has been published in 1929.

According to this system every color, shade or tint can be expressed by 3 "dimensions" namely hue, value and chroma. Hue is the name of the color, namely red, yellow, green, blue and purple and is designated by initials, R for red, Y for yellow, etc. Intermediate hues are designated as YR: yellow-red, etc. with secondary intermediate hues as YRY: yellow-red-yellow, the intermediate hues being divided into 10 graduations. 9 YR represents, for instance, a shade of reddish yellow close to the yellow-red-yellow. Value is the amount of light in a color and chroma is the degree of strength in a color. The values in this system are graduated from 0, which represents perfect black, to 10 which stands for perfect white. The chromas are likewise indicated by numerals with the low numerals 1, 2, etc. indicating chromas close to the neutral grays and figures up to 8 and more indicate increasing chromas or strengths. A given color is then represented by a set of figures H V/C: first the hue initial, then comes the figure for value followed by a diagonal line and then the figure for chroma. R 6/3 is, for instance, a red at the sixth level of value and three steps out in chroma; it is red midway between white and black. The color commonly known as "rose" is a grayish red, a red that is weak in chroma and is designated by R 6/4.

The whole color field can by this system be represented by a space figure which for colors up to medium chromas is a sphere in which the bottom pole is black and the top pole white, the axis representing the neutral grays, the colors of very high chromas extending outside the sphere. The sphere is divided in horizontal zones from 1 to 9, each for a different value, the distances at right angle from the vertical axis represent the chromas and on the equator are plotted the hues.

The field of colors embraced in our invention forms in this system a central cylindrical portion spreading out into a part of a spherical wedge.

Expressed in numerical figures according to the Munsell system, this field covers the grays and all hues of values from 4 to 8 and chromas from 0 to 1; on chromas above 1 it embraces the hues from green through yellow to red at values of 4 to 8 at the chroma of 1, up to values of 5 to 9 for a chroma of 3 and values of 5 to 9 for chromas of 3 to 8.

Figure 1:
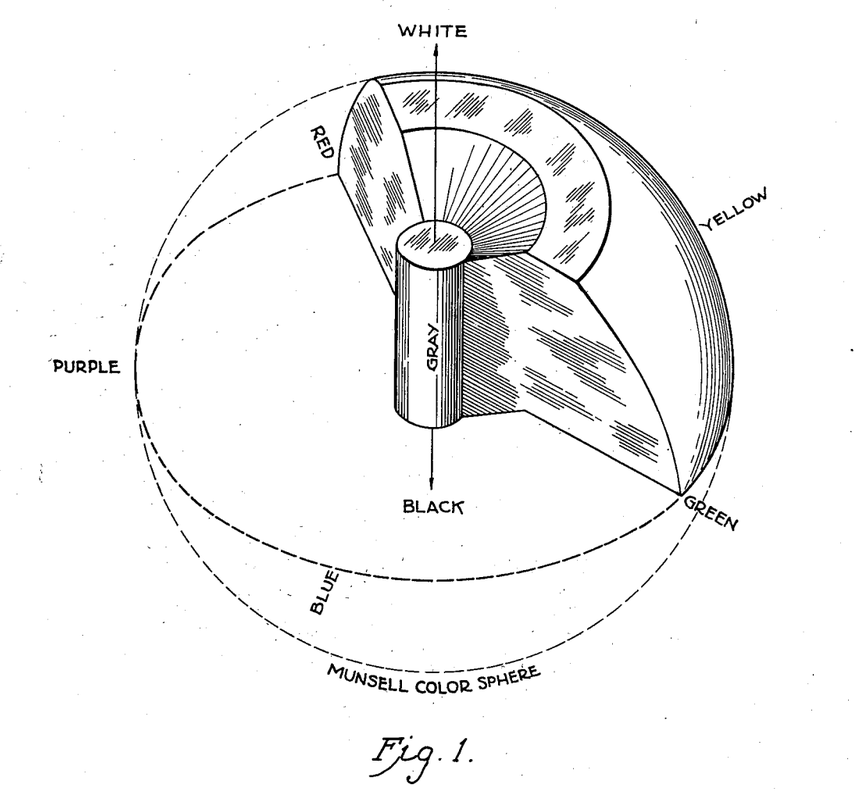

Fig. 1 represents the imaginary solid circumscribing the colors represented by the above figures for the Munsell formula H V/C. This figure is a perspective 45° view of this solid which clearly shows the cylindrical portion surrounding the grays, the wedgelike zone of the colors green through yellow to red with its inner zone of low chromas where the values increase with increasing chromas with its funnel-shaped upper surface and its lower surface in the shape of a section of an inverted cone, and the outer zone in which the values remain constant with increasing chromas. This figure also shows in dotted lines the outline of the imaginary Munsell sphere with its equator on which the location of the principal hues is indicated. This figure is mainly intended to visualize the limited field of colors obtainable by our invention, namely the medium grays and the darker part of the light grays, the dull reds, yellows, greens, tans, browns, buffs of a range somewhat lighter (of a higher value) in the case of the higher strength colors (of higher chroma) than in the case of the grays and the weaker colors. This figure excludes the dark to very dark and very light shades of all colors, it also excludes all colors which can be considered to contain dominant amounts of blue and purple.

The determination of the position of a given pigment in the Munsell color system is done by comparing a linseed oil rub out of the pigment with the colors reproduced in the Munsell color atlas, whereby the values for H, V and C in the formula H V/C are directly obtained. The values of V and C can then be plotted on a diagram of co-ordinates which can be established for any hue.

Figure 2:
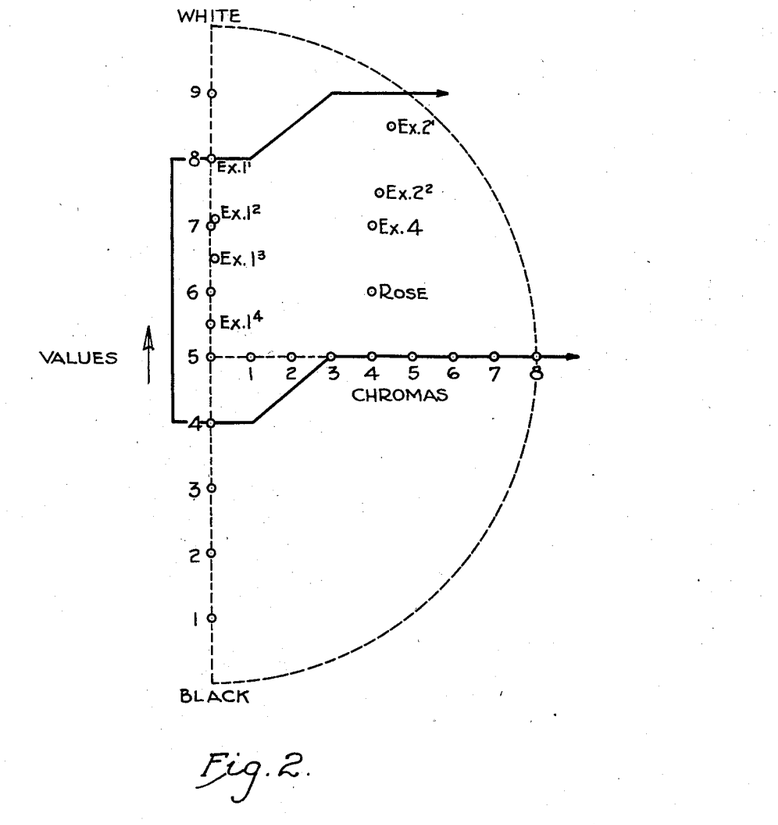

Fig. 2 is such a diagram of co-ordinates showing the limits of the field of colors which can be obtained according to our invention. This diagram is identical for all colors between green through yellow to red. The solid of Fig. 1 is obtained by rotation of the plane area of Fig. 2 through 144°. We have plotted on this diagram the colors of several pigments obtained according to the examples given below. We have also shown thereon the position of the color "rose" mentioned above.

There is within this field a second preferred field of colors which can most easily be produced by our novel process which colors are the ones most desirable for commercial application of our invention. This preferred field covers the grays, buffs, tans, yellow browns, etc. and can be described in the Munsell color scale as embracing the grays at values of 5 to 7, chromas of 0 to 1 and the hues of yellow-green-yellow through yellow to yellow-red at values of 5.25 to 7.25 for chromas of 1 increasing to values of 5.5 to 9 at chromas up to 4, increasing to values of 6 to 9 up to chromas of 8. In the field of colors of chromas above the grays, namely for chromas above 1 the pigments are most conveniently produced by the use of chromium compounds, whereas the grays are produced by the addition of vanadium compounds.

The distinguishing characteristic of our novel tinted pigments is their remarkable resistance to fading and chalking on outside exposure.

Another valuable property of our novel pigments is that they do not separate on standing or in paint compositions into a white and a colored component, such as is frequently the case with mixtures.

Heretofore tints, such as we produce now according to our invention, could only be obtained by mechanically mixing a white pigment with a colored pigment, such as by mixing calcined white $TiO_2$ with iron oxide or carbon black, etc.

Coating compositions made from such mixed pigments have the serious drawback that they fade on outside exposure. This fading is not due to light sensitiveness of the colored admixtures contained in the paints. The following explanation has been advanced for this fading. The film of oil or other vehicle which surrounds the pigment particles proper in the coat gradually oxidizes and is removed on outside exposure leaving on the surface a layer of pigment particles surrounded by air. This phenomenon is known as chalking of the paint. Air has a much lower index of refraction than the paint vehicle and according to well known laws of optics the hiding power of the white pigment particles will in such a layer in which the particles are surrounded by air considerably increase over that of colored particles contained in the layer and the surface of the paint will appear nearly white; this is known as fading of tinted paints on exposure.

This phenomenon of fading is greatly decreased or avoided by either or both of the following changes: if the paint contains pigment particles which are all of substantially the same tint or if the chalking of the paint is suppressed.

The pigments of our invention show both features; their chalking is minimized and if they chalk on excessive exposure, the chalk is colored.

The tinted titanium oxide pigments of our invention have the unexpected and as yet unexplained property of definitely suppressing the chalking of their paint films. This property is so pronounced that it protects white pigments or extenders which may be mixed with the tinted pigment in controlled amounts; the resulting pigments and paints retain satisfactory non-chalking and non-fading characteristics.

The tinted products of our invention are composed of particles which, when observed under the microscope, show substantially the same tint or color; the product appears homogeneous and is easily distinguished from a mechanical mixture of calcined $TiO_2$ and a colored pigment. The uniformity of the pigment particles as shown under the microscope is attributed to the fact that the titanium is calcined in intimate admixture with the coloring element. To distinguish such co-calcined pigments from mere mechanical mixtures and from mere adsorption compounds we call our uniform pigments "coalesced".

In the following table a number of tinted titanium oxide pigments are listed which were made according to our invention by calcining for 10 minutes at 950° C. a raw $TiO_2$ mixture obtained by adding 1 mol. per cent of the coloring element to a precipitated, titanium oxygen compound obtained by hydrolysis of a titanium sulfate solution. The colors given are those of linseed oil rub-outs of the pigments obtained.

| Salt added | Color of rub-out | Color in Munsell system |
|---|---|---|
| Chromic nitrate— $Cr(NO_3)_3.9 H_2O$ | Light gray tan | Y 7.2/4 |
| Chrome alum— $Cr_2(SO_4)_3.K_2SO_4.24H_2O$ | Buff | 10 YR 7.2/4 |
| Potassium dichromate— $K_2Cr_2O_7$ | Dark buff | 10 YR 7.2/4.5 |
| Cobaltous nitrate— $Co(NO_3)_2.6H_2O$ | Gray ivory | Y 8.2/2 |
| Cupric nitrate— $Cu(NO_3)_2.3H_2O$ | Light green with very slight yellow cast. | 10 Y 8.5/2 |
| Ferric sulfate— $Fe_2(SO_4)_3. 9H_2O$ | Cream | 3 Y 8/2 |
| Potassium permanganate— $KMnO_4$ | Pink fawn | YR 8.2/2 |
| Nickel nitrate— $Ni(NO_3)_2.6H_2O$ | Ivory with slight green cast. | 6 Y 9/4 |
| $V_2O_5$ (C. P.) dissolved in HCl. | Gray | Y 6.5/1.5 |
| $V_2O_5$ (Tech.) dissolved in HCl. | Gray | Y 6.8/1 |

The exact tints obtained with the individual coloring compounds depend upon various factors in the preparation of the tinted pigment.

The tints desired and useful for the preparation of paints and enamels are usually obtained within the range of about 0.3 to 7 mol. per cent of the coloring metal compound which will be present in the finished pigment and within this range the depth of the tint increases to a certain extent with increasing amounts. With less than 0.3 mol. per cent the products are of the nature of discolored white pigments and are of no utility whatsoever; with amounts above 7 mol. per cent the colors are too dark and are of a dirty, unsightly appearance; the true nature of the titanium dioxide is masked to such an extent that the pigments lose some of the valuable properties of titanium dioxide.

Chromium and vanadium form a noticeable exception to this rule inasmuch as amounts less than 0.3 mol. per cent are sufficient to produce distinct colors in the pigment.

Calcination temperatures of between 800 and 1000° C., preferably around 950° C., are in general satisfactory to develop the pigment properties but higher temperatures up to for instance 1250° C. can be used and such higher temperatures tend to increase the depth of the tint (decrease the value in the Munsell system).

It is in many instances beneficial to effect calcination in the presence of water vapor and sometimes in an oxidizing atmosphere. Water vapor or steam being desired in the presence of the pigment during calcination, it is unnecessary to dry the crude pigment; the wet cake can be charged directly into the calcination furnace. The oxidizing atmosphere, when desired, is conveniently produced by passing a stream of air over the product during calcination.

In the following we are giving specific examples of how we prepared tinted titanium oxide pigments according to our invention.

*Example I.*—100 cc. of 77.64 g/1 $K_2CO_3$ solution and 50 cc. of 122.40 g/1 $V_2O_5$ (Tech.) dissolved in HCl were separately added to 3 l. of 300 g/1 raw $TiO_2$ slurry. This corresponded to the addition to the $TiO_2$ of 1.0 mol. per cent potassium and 0.5 mol. per cent vanadium, or the addition of 0.86 per cent $K_2CO_3$ and 0.57 per cent $V_2O_5$ by weight. The treated slurry was stirred and set aside 16 hours in order to allow the salts to become intimately mixed with the $TiO_2$ particles. The slurry was then filtered and 1200 cc. of filtrate removed. The resultant wet cake was placed in a rotating calciner at 950° C., heated up to 950° C. in one hour and held at that temperature for 30 minutes while a stream of air plus steam was passed over the charge. The resultant product was ground to form a pigment of desired texture. Products thus prepared were of light gray color of a rating N 8/0.

By varying the calcination conditions we have, for instance, obtained with the same amount of vanadium pigments of the following ratings: 5 B 7.1/0.03 and 5 Y 6.6/0.01 which are likewise classed as light grays.

Increasing the amount of vanadium to 150 cc. instead of the 50 cc. used above and calcining at 950° C. has given us a pigment of medium gray color with a rating of N 5.5/0.

It will be understood that similar pigments will be obtained by the incorporation of other vanadium compounds into the uncalcined titanium oxide or varying the amounts of compounds added and changing the calcination conditions.

*Example II.*—100 cc. of 77.64 g/1 $K_2CO_3$ solution and 10 cc. of 218.1 g/1 $K_2CrO_4$ solution were separately added to 3 l. of 300 g/1 raw $TiO_2$ slurry. This corresponded to the addition to the $TiO_2$ of 1.0 mol. per cent potassium as potassium carbonate and 0.1 mol. per cent chromium, or the addition of 0.86% $K_2CO_3$ and 0.24 per cent $K_2CrO_4$ by weight. The treated slurry was stirred and set aside 16 hours in order to allow the salts to become intimately mixed with the $TiO_2$ particles. The slurry was then filtered and 1200 cc. of filtrate removed. The resultant wet cake was placed in a rotary calciner at 950° C., heated up to 950° C. in 45 minutes and held at that temperature for 30 minutes. The resultant product was ground to form a pigment of desired texture. The product thus prepared was light buff of a color approximately 2 Y 8.4/4.5 on the Munsell color scale.

Another sample prepared in exactly the same manner, with the exception that 35 cc. of potassium chromate solution rather than 10 cc. were added, was a medium buff color approximating 10 YR 7.5/4.2 on the same scale.

It will be understood that similar pigments may be prepared by adding other chromium compounds or varying the amounts of such additions and changing the calcination conditions.

*Example III.*—Vanadium pentoxide was dissolved in hydrochloric acid and the solution was added to a precipitated titanium oxide hydrolysate slurry containing a small amount of potassium sulfate. The amount of the vanadium added corresponded to 1 per cent $V_2O_5$ of the titanium figured as $TiO_2$. The mixture of titanium oxide and vanadium compound was well mixed, filtered and calcined at about 950° C. without passing air or steam over the product during calcination. The resulting product formed a light gray pigment which under the microscope appeared entirely homogeneous.

*Example IV.*—To a slurry of raw titanium oxide hydrolysate we added chrome alum, $Cr_2(SO_4)_3.(NH_4)_2SO_4.24H_2O$ in an amount corresponding to about 1 per cent of the weight of the titanium oxide. The slurry was then neutralized by the addition of potassium carbonate, well mixed, filtered and calcined. The resultant product was a light buff pigment which appeared homogeneously colored when examined under the microscope. Its rating in the Munsell color scale was 10 YR 7/4.

The presence of a potassium compound in the precipitated titanium oxide of the above examples has no particular influence on the color of the finished pigments. This addition was resorted to in order to obtain the fullest development of the pigment properties of the titanium oxide proper and follows the practice disclosed in U. S. Patent 1,892,693 of Jan. 3, 1933.

By addition of various amounts of vanadium and chromium compounds we have produced pigments of, for instance, the following ratings:

Medium gray _____________________ 5 Y 5.8/0.1
Medium gray _____________________ 5 Y 5.5/1.5
Medium buff _____________________ YRY 8.2/4.5
Medium buff _____________________ 1 Y 7.6/4.4
Medium buff _____________________ 4 Y 8.8/4.5
Dark buff _______________________ YRY 6.4/4.0

The incorporation of the heavy metal compound into the titanium oxide can be effected in various ways. As shown in the above examples we can add a solution of a heavy metal salt to precipitated titanium dioxide. We can also add the heavy metal salt to a solution of a titanium salt such as the sulfate or chloride and then heat to effect hydrolysis. We can also add, for instance, a heavy metal hydroxide, oxide, salt or other compound to a titanium solution from which the titanium is subsequently precipitated, or directly to a precipitated titanium compound, intimately mix the two and then calcine the mixture. It would seem that the association of the two compounds takes place mainly during calcination, though the heavy metal compounds also appear to be physically adsorbed upon the titanium hydroxides obtained, for instance, on hydrolysis of a titanium salt solution and the amounts of soluble salts added to a solution closely correspond in most instances to the proportionate amount found in the finished pigment. In the case of above Example II it was, for instance, found that 98.2% of the chromium added to the titanium compound was retained in the finished pigment which contained 0.066 part of Cr per 100 parts of $TiO_2$. When larger amounts of chromium compounds are added the proportionate amount of Cr retained in the pigment decreases, however, and proportionately lesser amounts are found in the pigment.

The following table gives results of a number of experimental runs on absorption and chromium content of various tinted pigments produced according to our invention.

| Soluble chromium added to titanium in mol. percent Cr | Total percent Cr retained | Chromium in finished pigment, parts Cr per 100 parts $TiO_2$ |
| --- | --- | --- |
| 0.1 | 96.8 | 0.066 |
| 0.7 | 93.08 | 0.424 |
| 1.4 | 91.98 | .82 |
| 2.8 | 77.05 | 1.4 |

In the case of the vanadium containing pigment of Example I, 70.3 per cent of the soluble vanadium added was retained in the finished pigment which contained 0.326 part V per 100 parts $TiO_2$.

The amounts of heavy metal compound which can be associated with a titanium oxide according to my process without profoundly altering the nature of the $TiO_2$ and which will produce a tinted pigment within the range of colors contemplated will necessarily vary somewhat with different metals. It will be understood that in cases where a water soluble heavy metal compound is added to an aqueous composition containing the titanium compound an amount of said water soluble compound should preferably be added in excess of that desired in the finished pigment to compensate for that amount which might not be adsorbed upon or incorporated into the precipitated titanium oxygen compound; this applies particularly to such instances where several per cent of the heavy metal compound is desired in the finished pigment.

In mixing or incorporating a water insoluble heavy metal compound with the titanium oxygen compound before calcination the amount which will be found in the finished pigment will be substantially the same as added. By adding a water soluble compound to an aqueous composition of a titanium compound the amount thereof adsorbed or otherwise incorporated with the titanium precipitate in a manner not easily extractable by water will likewise be substantially the same as that found in the finished pigment.

It is also possible, though less desirable, to impregnate a calcined titanium oxide with a salt or compound of a heavy metal and then calcine anew whereby the heavy metal compound associates itself with the titanium oxide and produces pigments entirely similar to those obtained by the above described procedures.

The following have been found to be limits for metal compound content of finished $TiO_2$, the figures are given as parts of metal in 100 parts by weight of TiO$_2$.

0.01 to 2.5 parts of Cr per 100 parts TiO$_2$ can easily be incorporated into TiO$_2$ and the resulting pigment will range from gray to yellow to red, the best commercial products within our preferred field of colors being produced with amounts from 0.03 to 0.75. A light buff was, for instance, obtained with 0.064, a medium buff with 0.225 and a dark buff with 0.73 part Cr per 100 parts TiO$_2$.

In the case of vanadium, tinted pigments were obtained within the range of 0.05 to 5.0 parts V per 100 parts TiO$_2$ and most desirable products with 0.2 to 2.0; 0.38 having, for instance, produced a light gray, 1.15 a medium gray and 1.75 a dark gray.

For other heavy metals, tinted pigments within the field of colors specified were obtained when the pigments contained the following amounts:

| | |
|---|---|
| Iron | 0.7 to 5.0 |
| Cobalt | 0.7 to 5.0 |
| Copper | 0.3 to 5.0 |
| Manganese | 0.3 to 5.0 |
| Nickel | 0.3 to 5.0 | parts by weight of the metal per 100 parts of TiO$_2$.

We have in the foregoing particularly described, explained and illustrated our invention in connection with tinted products in which straight TiO$_2$ forms the white, base pigment. Our invention is, however, also applicable to complex pigments in which the titanium oxide is coalesced with white extenders such as barium or calcium sulfate.

For the production of tinted, coalesced titanium pigments we proceed in a manner entirely similar to that of producing tinted pigments from straight titanium oxide. We again add a heat decomposable compound of a heavy metal which, on calcination in the presence of TiO$_2$, forms a colored compound, to the medium in which we produce the coalesced uncalcined pigment; for instance, we add a vanadium or chromium compound, such as a salt, oxide, hydroxid, etc. to a titanium sulfate solution to which we also add calcium or barium chloride and heat the solution to effect hydrolysis of the titanium salt. We then separate the precipitate which retains the vanadium, chromium, etc. compound and calcine it under the desired conditions. The amounts of heavy metal to be used in this case are substantially the same per unit weight of white pigment as those indicated per unit weight of TiO$_2$.

As a general rule the calcination conditions required are the same for tinted coalesced pigments as for tinted straight TiO$_2$ pigments and produce very similar tints when used on titanium compounds coalesced with barium and calcium sulfate.

When our novel products are mixed with a vehicle to form a coating composition such as a paint, lacquer, enamel, etc. we have found that such a composition is exceedingly resistant to fading and that it retains substantially its original tint even on prolonged exposure.

It is desirable in the formulation of paints, particularly for outside exposure, to add to the pigments proper substances of little covering power, so-called extenders, such as blanc fixe, fibrous talc, silica, ground barytes, whiting, etc. for their bulking value and thickening effect on the paints.

The great resistances to chalking and fading imparted to paint and enamel films by our tinted titanium oxide pigments allows the addition of white extenders to such compositions, the presence of the tinted TiO$_2$ pigment protecting in an unexpected manner the final paint film from the usual chalking and fading due to the presence of a white component in a colored paint composition.

Besides the above white extenders we can also add leaded zinc oxide to our tinted titanium oxide pigments to increase the durability of the paint films. Similarly, as is the case with the white extenders, the resistance to fading and chalking is maintained if such leaded zinc oxide is added to the tinted TiO$_2$ paints which may therefore contain only either one or both these types of added components without losing their desirable non-chalking and non-fading characteristics.

We have also found that the non-fading characteristics of the coating compositions made from our tinted TiO$_2$ pigments are maintained if we mix tinted TiO$_2$ pigments of different composition and color, for instance, a gray with a buff colored TiO$_2$ to produce a drab, or we can associate uncalcined titanium oxygen compounds with more than one metal compound which combination on calcination produces a tinted pigment and we are thereby enabled to extend the tints obtainable.

As a further improvement we have found that the non-fading characteristics of coating compositions made with our novel tinted titanium oxide pigments is also preserved if we use only such extenders which have a tint or color approaching that of the pigment itself. Extenders of this type are available from naturally occurring, impure, colored barytes, ochres, clays, fibrous talc, talc, also phosphate plasters, etc. When finely ground such substances are well adapted to be used as extenders with our tinted pigments. The choice of the particular extender for use with a given tinted titanium oxide pigment is made by blending the two in the dry state. The blend is then mixed with oil and the color in oil compared with the color in the dry state. A minimum difference between the two indicates that the fading, due to chalking, will be at a minimum. Gray, buff and off colored barytes give, due to their good durability, good chalk resistance and a range of available tints particularly adapted to serve as colored extenders for our tinted pigments.

The non-fading and chalking resistance imparted to paints, enamels or other coating compositions by our tinted titanium oxide pigments when they also contain other white or colored components is of the utmost practical importance as in few instances the paints, etc. will be made from the tinted titanium pigment and the paint vehicle only.

The formulation of coating compositions for which our novel pigments are adapted calls commonly for the addition of various solid ingredients other than the pigment proper. As elaborated upon before, our pigments are compatible with white extenders, colored extenders or other solid ingredients such as zinc oxide, leaded zinc oxide, lead compounds and such components can be added singly or any number of them can be incorporated into the paints, etc. without detrimentally affecting the basic properties imparted to the compositions by the tinted titanium oxide. On the contrary the various ingredients cooperate to fully develop such properties as consistency, resistance to weathering, non-livering of the paints which are essential to the practical usefulness of the paints, etc.

As a convenience to the paint makers our novel tinted pigments are optionally blended in either the wet or dry state with the particular extenders and other solid ingredients desired in the coating composition and the complete mixture of the solid ingredients is then marketed. This insures the paint maker of a uniform blend and avoids the necessity and cost of separately selecting and weighing the materials for each batch.

In the following we are giving a number of coating compositions of various types using our novel pigments.

I. Oil type paints

The following illustrates various pigment-extender combinations:

| | | Parts by weight |
|---|---|---|
| (A) | Tinted TiO₂ pigment | 35 |
| | Blanc fixe | 105 |
| | 35% leaded zinc oxide | 45 |
| | Basic carbonate white lead | 20 |
| (B) | Tinted TiO₂ | 60 |
| | Blanc fixe | 180 |
| | 35% leaded zinc oxide | 40 |
| (C) | Tinted TiO₂ | 25 |
| | Blanc fixe | 75 |
| | Basic carbonate white lead | 35 |
| | Zinc oxide | 20 |
| (D) | Tinted TiO₂ | 25 |
| | 35% leaded zinc oxide | 50 |
| | Fibrous talc plus silica | 25 |

(E) Blanc fixe in formula D instead of the fibrous talc plus silica.
(F) Barytes in formulas A, B, C and E instead of blanc fixe.
(G) Fibrous talc in formulas A, B, C, and F instead of blanc fixe.

The paints were made in each case with 92% acid refined oil, 8% kettle bodied oil at a 28.5% pigment volume with standard mineral thinner and a drier.

A long oil type of paint having excellent exterior durability is illustrated by the following formula:

| | Percent |
|---|---|
| Tinted TiO₂ pigment | 25.0 |
| Heat bodied linseed oil | 45.4 |
| Lead-manganese drier | 1.3 |
| Mineral spirits | 28.3 |

The paint of this formula was hardened by the addition of zinc oxide, for instance as follows, the parts being by weight:

| | Parts |
|---|---|
| Tinted TiO₂ pigment | 22.5 |
| Zinc oxide | 7.5 |
| Heat bodied linseed oil | 43.0 |
| Lead-manganese drier | 1.3 |
| Mineral spirits | 27.7 |

For an excellent metal protective paint the following composition was prepared, the parts being by weight:

| | Parts |
|---|---|
| Tinted TiO₂ | 15.0 |
| 35% leaded zinc oxide | 30.0 |
| Magnesium silicate extenders | 25.0 |
| Linseed oil | 37.2 |
| Lead-manganese drier | 2.8 |

When the paints made from tinted TiO₂ are intended for metal protective purposes, we prefer in general to incorporate into their formulation a considerable amount of a basic pigment such as the leaded zinc oxide shown in the above formula, whereby satisfactory rust resistance is obtained.

Numerous variations in the formulation of such paints can be effected.

They can be made for interior finishes where our novel tinted TiO₂ pigments are characterized by freedom from flooding, i. e. separation of pigments of different color value, which is a serious drawback in such type of paints when made up from a white and a colored pigment.

Among such paints we might further mention flat paints of low binder content in which the pigment-binder ratio is up to 1.0 : 0.5 and the chief vehicle is a bodied oil, such as heat bodied oil, blown oil or a combination of the two with or without the addition of refined linseed oil.

In these highly pigmented paints we prefer to use only about ⅓ tinted TiO₂, the balance being extenders of high bulking value.

Other paints in which our novel pigments are of especial value are also high binder flat paints in which the pigment binder ratio ranges for instance between 1 : 0.5 and 1 : 0.8.

In egg-shell finishes we still increase the amount of binder to a ratio of about 1 pigment : 1.2 binder.

For gloss finishes within the above ranges we add a small amount of gloss oil (from 2 to 5%).

The total pigment in our novel paints can range from 55% (by weight) down depending on hiding power and other properties desired. At the higher pigment contents, properly chosen extenders could be used in combination with the tinted TiO₂, unless excessive hiding power is desired.

Driers useful in these paints are cobalt driers for a quick top set up in combination with a lead-manganese drier for under dry and hardening.

The thinners in our paints can be any desired combination of mineral spirits, turps, kerosene, etc. to obtain desired brushing, leveling of brush marks, lap time, gloss, etc.

Various drying oils can be incorporated in our novel paints in addition or substitution of linseed oil vehicles, such as China-wood oil, soya bean oil, etc. with varying percentages of gum to oil.

The paints were made in various shades of grays and buffs and compared with paints made from a similar formulation in which the tinted titanium oxide was replaced by the same amount of white titanium oxide and an amount of carbon black, iron oxide, etc. mixed into the paint to give it the same shade. In every instance the paints made with white TiO₂ with leaded zinc oxide and extender and shaded by mechanical mixing with a colored pigment showed considerable chalking and fading on outside exposure whereas the paints made from tinted TiO₂ stood up perfectly under the same exposure conditions.

II. Enamels containing a resin

Quick drying enamels were made with the following pigment mixtures:

| | Parts | | Parts |
|---|---|---|---|
| (A) Tinted TiO₂ | 75 | Silica | 25 |
| (B) Tinted TiO₂ | 65.5 | Blanc fixe | 34.5 |
| (C) Tinted TiO₂ | 64.3 | Barytes | 35.7 |
| (D) Tinted TiO₂ | 73.8 | Fibrous talc | 26.2 |

In each instance enamels were prepared with tinted TiO₂ pigments of different shades and containing different heavy metal compounds associated with the TiO₂.

For each composition a similar enamel was prepared in which the tinted TiO₂ was replaced by a mechanical mixture of white TiO₂ and a colored pigment, such as carbon black, iron oxide, etc., of equivalent shade and both types submitted to outside exposure tests.

Here, again, it was found that the enamels made from tinted TiO$_2$ showed hardly any fading or chalking whereas the paints made from mixed pigments chalked badly and faded in relatively short time.

An orthodox enamel type of product is illustrated in the following example:

| | Percent |
|---|---|
| Tinted TiO$_2$ | 25.0 |
| 50 gal. ester gum varnish | 60.0 |
| Mineral spirits | 15.0 |

The ester gum varnish used in this composition is of the type common in this art and carries about 50% mineral spirits as a solvent.

The usual resins used in the preparation of enamels can be used for the preparation of coating compositions based on our novel pigments, enamels of excellent characteristics, particularly non-chalking have been prepared with our tinted titanium pigments with natural resins and synthetic resins, such as glycerol-phthalic anhydrid resins, phenol-formaldehyde resins, etc.

As an example of such coating composition we might mention the following intended as a floor and deck paint:

| | Percent |
|---|---|
| Tinted TiO$_2$ | 22.5 |
| Silica | 22.5 |
| Glycerol-phthalic anhydrid resin dissolved in 50% mineral spirits | 53.8 |
| Drier | 1.2 |

Enamels containing phenol-formaldehyde resins are sometimes distinguished by easy chalking and our novel tinted TiO$_2$ pigments are therefore particularly adapted for this type of coating compositions as the properties of our pigments allow of the production of enamels producing a self-cleaning, fade-resistant finish. The following is a formulation of such a non-fading chalk resistant finish.

| | Percent |
|---|---|
| Tinted TiO$_2$ | 26.5 |
| Phenol-formaldehyde resin containing China-wood oil | 66.2 |
| Mineral spirits | 4.3 |
| Drier | 3.0 |

III. Coating compositions containing an alkyd resin

Alkyd resins are old modified condensation products of glycerol and phthalic anhydrid, as disclosed in U. S. Patent 1,885,024 of Oct. 25, 1932, to Patterson & Lewers.

We found that our novel tinted titanium oxide pigments are particularly adapted to form with these alkyd resin enamels of great resistance to chalking.

A few examples of such composition enamels are given below:

| | | Percent |
|---|---|---|
| (a) | Tinted TiO$_2$ | 44.4 |
| | Alkyd resin | 29.4 |
| | Solvent naphtha | 5.8 |
| | Mineral spirits | 18.0 |
| | Lead-manganese drier | 2.4 |

(b) In this formula part of the titanium pigment of strong hiding power is replaced by barytes, the parts being by weight:

| | Parts |
|---|---|
| Tinted TiO$_2$ | 12.2 |
| Barytes | 36.6 |
| Alkyd resin | 32.6 |
| Solvent naphtha | 5.6 |
| Mineral spirits | 20.0 |
| Lead-manganese drier | 3.0 |

(c) This example illustrates the use of antimony oxide with tinted titanium pigments. It is shown in U. S. Patent 1,885,025 of Oct. 25, 1932, to Patterson that antimony oxide improves the gloss of various enamels and we have found that this applies likewise to enamels containing tinted TiO$_2$ pigments.

| | Percent |
|---|---|
| Tinted TiO$_2$ | 7.5 |
| Blanc fixe | 24.0 |
| Antimony oxide | 19.3 |
| Alkyd resin | 27.1 |
| Mineral spirits | 15.0 |
| Solvent naphtha | 3.9 |
| Lead-manganese drier | 3.2 |

(d) This exemplifies a "short oil" type of enamel:

| | Percent |
|---|---|
| Tinted TiO$_2$ | 20.9 |
| Alkyd resin | 26.2 |
| Mineral spirits | 35.0 |
| Solvent naphtha | 16.7 |
| Cobalt drier | 1.2 |

IV. Tinted TiO$_2$ in pyroxylin lacquers

Our novel tinted titanium oxide pigments are also well adapted for pigmenting pyroxylin lacquers and plastics.

The following is an example of such a coating composition:

| | Parts |
|---|---|
| Low viscosity pyroxylin | 17.0 |
| Dibutyl phthalate | 6.0 |
| Castor oil | 3.5 |
| Tinted TiO$_2$ | 9.0 |
| Damar gum | 4.5 |
| | —— |
| | 40.0 |

The remaining 60 parts which go to make up the final lacquer are composed of the ordinary solvents used in these types of coating compositions. Such are, for instance, ethyl acetate, butyl acetate, ethyl alcohol, toluol, etc. which are used in proportions well known in this art.

After a representative outdoor exposure of articles painted with the above pyroxylin enamel it was found that the enamel films produced from this composition showed only very little chalking. The color of this chalk was also similar to the color of the film so that the effect of this reduced chalking was even still less noticeable.

Films from straight TiO$_2$ pigments blended with a colored pigment exposed under the same conditions are in direct contrast to the results above. The films from straight TiO$_2$ showed a definite chalking which was white and, therefore, very noticeable in contrast with the normal color of the original film.

The pyroxylin enamel finishes from tinted TiO$_2$ are readily polished to a high luster. A similar polishing treatment applied to enamels from straight TiO$_2$ blended with a colored pigment does not afford luster of the order of that produced on finishes obtained with tinted TiO$_2$.

A very large number of coating compositions embodying our novel tinted titanium pigments have been exemplified above and it will be understood that our invention is not limited to these particular formulations. As exemplified in more detail under the oil type paints wide variations in the pigment content of the coating compositions is permissible and this applies to the resin type of coating compositions as well as to pyroxylin or other enamels and plastics containing cellulose nitrate, cellulose acetate, regenerated cellulose or other cellulose derivatives.

Similarly, other solvents, resins, driers and other components useful in coating compositions can be used jointly with our novel pigments in such compositions.

The novel non-chalking, non-fading and homogeneity characteristics of our novel tinted $TiO_2$ pigments make them very valuable for numerous other uses besides coating compositions. We might mention the following as typical, it being understood that these uses do not exhaust the arts in which our novel pigments can find useful applications: compounding rubber, compounding linoleum, nitrocellulose plastics, cellulose acetate plastics, plastics derived from other cellulose compounds, delustering artificial silk threads, pigmenting casein and lactic acid plastics, incorporation into paper pulp pigmenting waxed papers, opacifiers for vitrified enamels and glasses, pigmenting insoluble phenol-formaldehyde resins, pigmenting glycerol-phthalic anhydrid resins, pigmenting resins derived from urea, etc.

We claim:

1. The process of making a tinted titanium dioxide pigment which comprises calcining at a temperature of at least 800° C. an intimate mixture of a compound selected from the group consisting of titanium dioxide and hydrated titanium dioxide with a predetermined minor amount of a compound of a metal of the group consisting of chromium and vanadium.

2. The process of making a tinted titanium dioxide pigment which comprises calcining at a temperature of at least 800° C. an intimate mixture of a compound selected from the group consisting of titanium dioxide and hydrated titanium dioxide with a predetermined minor amount of a vanadium compound.

3. The process of making a tinted titanium dioxide pigment which comprises calcining at a temperature of at least 800° C. an intimate mixture of a compound selected from the group consisting of titanium dioxide and hydrated titanium dioxide with a predetermined minor amount of a chromium compound.

4. The process of making a tinted titanium oxide pigment which comprises incorporating into a compound selected from the group consisting of titanium dioxide and hydrated titanium dioxide a vanadium compound and calcining at a temperature of at least 800° C. said mixture, said vanadium compound being present in said mixture in an amount corresponding to from 0.05 to 5.0 parts by weight of V for 100 parts of $TiO_2$.

5. The process of making a tinted titanium oxide pigment which comprises incorporating into a compound selected from the group consisting of titanium dioxide and hydrated titanium dioxide a chromium compound and calcining at a temperature of at least 800° C. said mixture, said chromium compound being present in said mixture in an amount corresponding to from 0.03 to 0.75 part by weight of Cr per 100 parts of $TiO_2$.

6. A tinted pigment comprising as its main opacifying titanium compound titanium dioxide coalesced with a colored vanadium compound, said vanadium compound being present in an amount corresponding to from 0.05 to 5.0 parts by weight of vanadium per 100 parts of said pigment.

7. A tinted pigment comprising as its main opacifying titanium compound particles of titanium dioxide coalesced with a colored vanadium compound, said vanadium compound being present in an amount corresponding to from 0.05 to 5.0 parts by weight of vanadium per 100 parts of titanium dioxide.

8. A tinted pigment comprising as its main opacifying titanium compound titanium dioxide coalesced with a colored vanadium compound, said vanadium compound being present in an amount corresponding to from 0.2 to 2.0 parts by weight of vanadium per 100 parts of titanium dioxide.

9. A tinted pigment comprising as its main opacifying titanium compound titanium dioxide coalesced with a colored chromium compound, said chromium compound being present in an amount corresponding to 0.01 to 2.5 parts by weight of chromium per 100 parts of said pigment.

10. A tinted pigment comprising as its main opacifying titanium compound particles of titanium dioxide coalesced with a colored chromium compound, said chromium compound being present in an amount corresponding to 0.01 to 2.5 parts by weight of chromium per 100 parts of titanium dioxide.

11. A tinted pigment comprising as its main opacifying titanium compound titanium dioxide coalesced with a colored chromium compound, said chromium compound being present in an amount corresponding to 0.03 to 0.75 part by weight of chromium per 100 parts of titanium dioxide.

12. A tinted pigment comprising as its main opacifying titanium compound titanium dioxide coalesced with a minor amount of a colored chromium compound, said titanium compound having a color, or tint, expressed in the Munsell color system within the following limits: values of 5 to 7 for chromas of 0 to 1, at the hues of yellow-green-yellow through yellow to yellow-red values of 5.25 to 7.25 for chromas of 1, increasing to values of 5.5 to 9 at chromas of 1 to 4 and increasing to values of 6 to 9 at chromas of 4 to 8.

13. As a new product titanium dioxide coalesced with a minor amount of a colored chromium compound, said product having a color, or tint, expressed in the Munsell color system within the following limits: values of 5 to 7 for chromas of 0 to 1, at the hues of yellow-green-yellow through yellow to yellow-red values of 5.25 to 7.25 for chromas of 1, increasing to values of 5.5 to 9 at chromas of 1 to 4 and increasing to values of 6 to 9 at chromas of 4 to 8.

14. A tinted pigment comprising as its main opacifying titanium compound titanium dioxide coalesced with a minor amount of a colored vanadium compound, said titanium compound having a color, or tint, expressed in the Munsell color system, of a value of from 4 to 8 at a chroma of 0 to 1.

15. As a new product titanium dioxide coalesced with a minor amount of a colored vanadium compound, said product having a color, or tint, expressed in the Munsell color system, of a value of from 4 to 8 at a chroma of 0 to 1.

ROBERT M. McKINNEY.
CARLTON E. SMITH.

CERTIFICATE OF CORRECTION.

Patent No. 2,062,137.                                              November 24, 1936.

ROBERT M. McKINNEY, ET AL.

It is hereby certified that error appears in the printed specification of the above numbered patent requiring correction as follows: Page 6, second column, lines 65 to 68 inclusive, in the table, strike out the division lines in the center thereof; page 7, first column, line 56, for the word "old" read oil; and that the said Letters Patent should be read with these corrections therein that the same may conform to the record of the case in the Patent Office.

Signed and sealed this 2nd day of March, A. D. 1937.

(Seal)                                    Henry Van Arsdale
                                         Acting Commissioner of Patents.